US007430681B1

(12) United States Patent
Hobbs (10) Patent No.: US 7,430,681 B1
(45) Date of Patent: Sep. 30, 2008

(54) METHODS AND APPARATUS FOR INTERFACING A DRAWING MEMORY WITH A REMOTE DISPLAY CONTROLLER

(75) Inventor: David V. Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 349 days.

(21) Appl. No.: 11/278,109

(22) Filed: Mar. 30, 2006

Related U.S. Application Data

(60) Provisional application No. 60/708,910, filed on Aug. 16, 2005, provisional application No. 60/667,157, filed on Mar. 30, 2005.

(51) Int. Cl.
*G06F 1/04* (2006.01)
(52) U.S. Cl. .................. 713/400; 713/503; 713/600
(58) Field of Classification Search .......... 713/400, 713/503, 600
See application file for complete search history.

(56) References Cited

U.S. PATENT DOCUMENTS

| | | | | |
|---|---|---|---|---|
| 6,142,913 | A * | 11/2000 | Ewert ............................ | 482/8 |
| 6,664,969 | B1 | 12/2003 | Emerson et al. | |
| 6,748,473 | B1 | 6/2004 | Shatas et al. | |
| 2002/0054044 | A1 | 5/2002 | Lu et al. | |
| 2003/0177172 | A1 | 9/2003 | Duursma et al. | |
| 2004/0062305 | A1 | 4/2004 | Dambrackas | |
| 2004/0213287 | A1 * | 10/2004 | Komori et al. .............. | 370/466 |
| 2005/0018611 | A1 * | 1/2005 | Chan et al. .................. | 370/241 |

OTHER PUBLICATIONS

Engel, K., Sommer, O., and Ertl, T., "A Framework for Interactive Hardward Accelerated Remote 3D-Visualization", Proceedings TCVG Symposium on Visualization (VisSym), 12 pages, 2000.
Hsiao, Pai-Hsiang., Kung, H.T, and Tan, Koan-Sin, Video over TCP with Receiver-based Delay Control, Proceedings of ACM NOSSDAV, 2001.
Lai, Albert and Neih, Jason, "Limits of Wide-Area Thin-Client Computing", Proceedings of the SIGMETRICS Conference on Measurement and Modeling of Computer Systems, 12 pages, Jun. 2002, Marine de Rey, CA.
Lamberti, Fabrizio et al., "An Accelerated Remote Graphics Architecture for PDAs", Web3D 2003 Symposium, 7 pages, 2003.
Nieh, Jason, Yang, S. Jae, "Measuring the Multimedia Peformance of Server-Based Computing", The 10th International Workshop on Network and Operating System Support for Digital Audio and Video, 10 pages, Jun. 26-28, 2000, Chapel Hill, North Carolina, USA.

(Continued)

*Primary Examiner*—Dennis M Butler
(74) *Attorney, Agent, or Firm*—Moser IP Law Group (57) ABSTRACT

A method of transmitting encoded computer display images between computers over a nondeterministic network is disclosed. During a display session in which images are transmitted from a host to a client, the client requests sections of encoded image updates at a predetermined time in advance of when the requested at least one section is to be transmitted by the display controller. When the requested section is received, a time value is compared to a display controller timing value and, if the difference between the compared times is outside of an acceptable range, the client adjusts a predetermined time at which time the client requests image sections from the host.

19 Claims, 9 Drawing Sheets

OTHER PUBLICATIONS

Nieh, Jason, Yang, S. Jae, Novik, Naomi, "A Comparison of Thin-Client Computing Architectures", Technical Report CUCS-022-00, 16 Pages, Nov. 2000, Network Computing Laboratory, Columbia University.

Schmidt, Brian K., Lam, Monica S., Northcutt, J. Duane, "The interactive performance of SLIM: a stateless, thin-client architecture", 17th ACM Symposium on Operating Systems Principles (SOSP'99), Published as Operating Systems Review, 34(5):32-47, Dec. 1999.

"OpenGL Vizserver™3.1 Application-Transparent Remote Interactive Visualization and Collaboration", White Paper, Silicon Graphics Inc., 15 pages, 2003.

* cited by examiner

FIG. 8 ly to methods for transferring computer display images across a network. The present invention has particular application to the systems and methods used to compress and transmit images rendered by the graphics sub-system of a data processing system. Display images in a frame buffer are accessed, compressed and transmitted based on timing requests from a remote display controller.

METHODS AND APPARATUS FOR INTERFACING A DRAWING MEMORY WITH A REMOTE DISPLAY CONTROLLER

RELATED APPLICATIONS

This application claims priority to Provisional Patent Application Ser. No. 60/708,910, filed Aug. 16, 2005, and Provisional Patent Application Ser. No. 60/667,157, filed Mar. 30, 2005, both incorporated herein by reference in their entirety.

FIELD

The present invention relates generally to methods for transferring computer display images across a network. The present invention has particular application to the systems and methods used to compress and transmit images rendered by the graphics sub-system of a data processing system. Display images in a frame buffer are accessed, compressed and transmitted based on timing requests from a remote display controller.

BACKGROUND OF THE PRESENT INVENTION

Historic advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the user interface devices, including the display and keyboard, from the application processing parts of the computing system. In this preferred configuration, the user interface devices are physically located at the desktop, while the processing and storage components of the computer are placed in a central location. The user interface devices are then connected to the processor and storage components with some method of communication.

Figure 1:
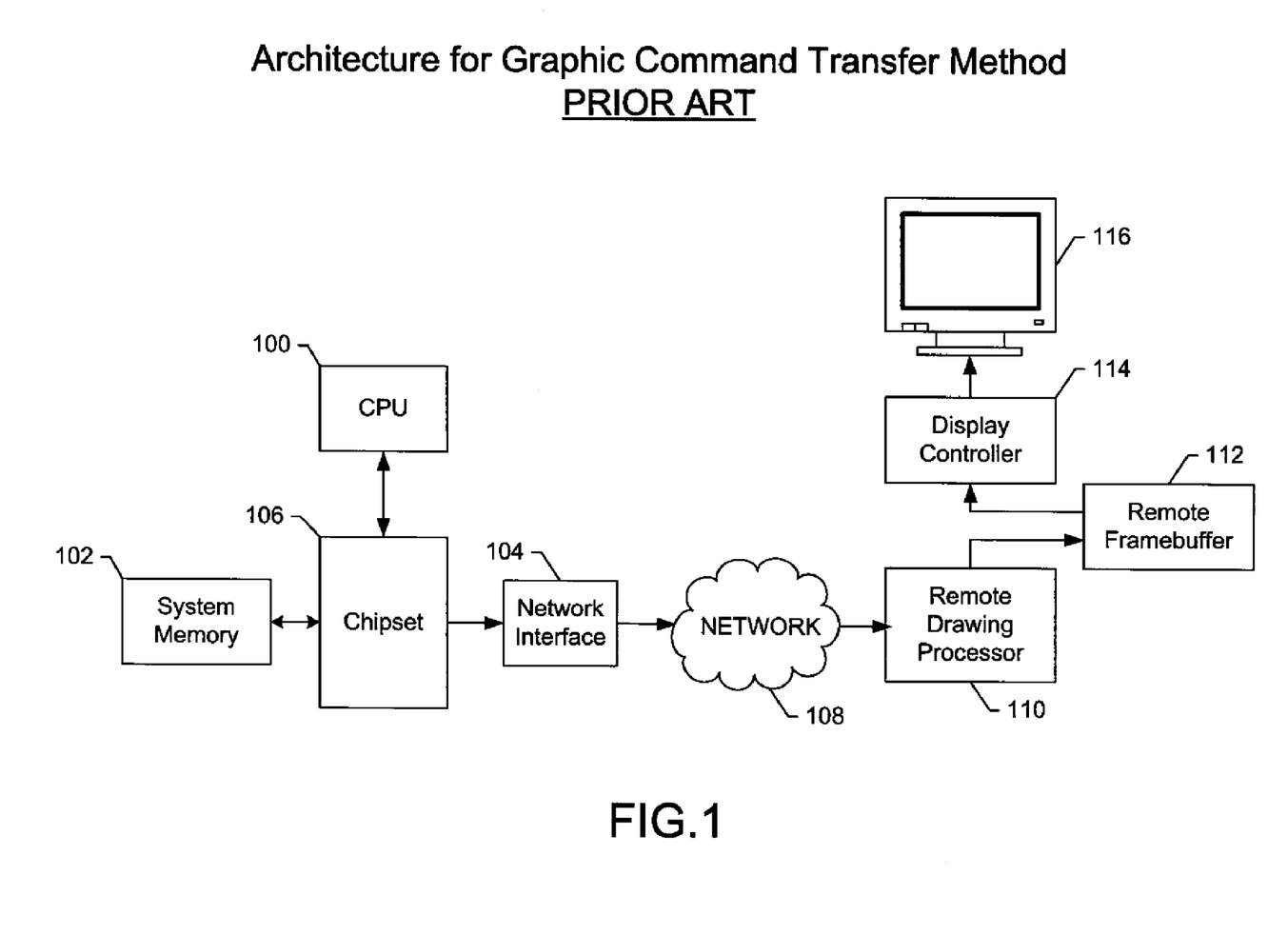
FIG. 1 is an illustration of a prior art data processing system architecture that supports the remote display of display images using the graphic command transfer method.

There are various methods for communicating the display image from a data processor across a standard network to a remote display. These methods are described below, identifying the problems with each method that is solved by this invention FIG. 1 shows the architecture for a data processing system that supports a remote display by transferring graphic commands across a network. In the diagram, central processing unit (CPU) 100 of the data processor is connected to various devices such as system memory 102 and network interface 104 by chipset 106.

CPU 100 uses a graphics application interface (G-API) such as OpenGL, GDI or others to draw a display image in the normal way but rather than being issued to a local Graphics Processing Unit (GPU), drawing processor or function, the graphics commands are trapped by software on the CPU and transmitted across network 108 to remote drawing processor 110.

Remote drawing processor 110 renders the display image in remote frame buffer 112. Remote display controller 114 then accesses the image in the frame buffer and provides a rasterized video signal for remote display 116. In a typical implementation, remote drawing processor 110 may be supported by a remote CPU, operating system and graphics drivers. In this case, the graphics commands are issued to the remote CPU which then draws the image using its local drawing capabilities and remote frame buffer 112 described.

Variations on the graphic command transfer method include the transmission of different abstractions of graphic commands. X Windows is one example that captures and transfers high level graphics commands while RDP is another example that converts most of the graphics commands to simple low-level primitives before transferring them to the remote system. Regardless of the level of abstraction, a CPU sub-system is usually required at the remote system as an interface between the commands and the remote drawing function.

One problem with the use of low level commands with simple remote hardware is that the system graphics capabilities are constrained by the low-complexity graphics capabilities of the remote system. This is due to high-level graphic commands that leverage graphics hardware acceleration functions in a typical computing platform no longer being available in the simplified command set. In order to draw complex images using simple commands, the number of commands increases significantly which increases the network traffic and system latency.

Another problem with graphic command transfer methods is that the graphic commands may relate to the rendering of structures outside of the viewable area of the display. In these cases where graphic commands don't immediately change the displayed region of an image, unnecessary network traffic is generated to accomplish the remote rendering. A third problem is that converting commands to simple commands is performed by the data processor and is a processing intensive function. The result is that the conversion process slows down the data processor and reduces the performance of applications running on the data processor.

To avoid out-of-order problems associated with sequentially dependent drawing commands, graphic commands need to be transmitted using a reliable network protocol (e.g. TCP/IP). A shortcoming of systems that support complex graphics commands is that these systems required increased complexity of the remote computing system (i.e. O/S, graphics driver and hardware). The result is an increase in cost, maintenance and support requirements for the remote user equipment which is in direct conflict with the original motivation for centralization i.e. reduced burden in supporting the remote display system.

The second method for separating the user interface from the data processor is the frame buffer copy method. This method solves the drawing performance problem described above by using the operating system, graphics driver and optional graphics drawing hardware features of the data processing system to first draw the image in a frame buffer on the data processor side of the network before transferring it. Frame buffer copy methods transfer also have the advantage of using a faster best efforts transfer methods (e.g. UDP/IP) rather than slower more reliable methods such as TCP/IP. This is because the data does not have the sequential dependence of graphic commands and it is easy to recover from occasional errors caused by lost data packets.

Figure 2:
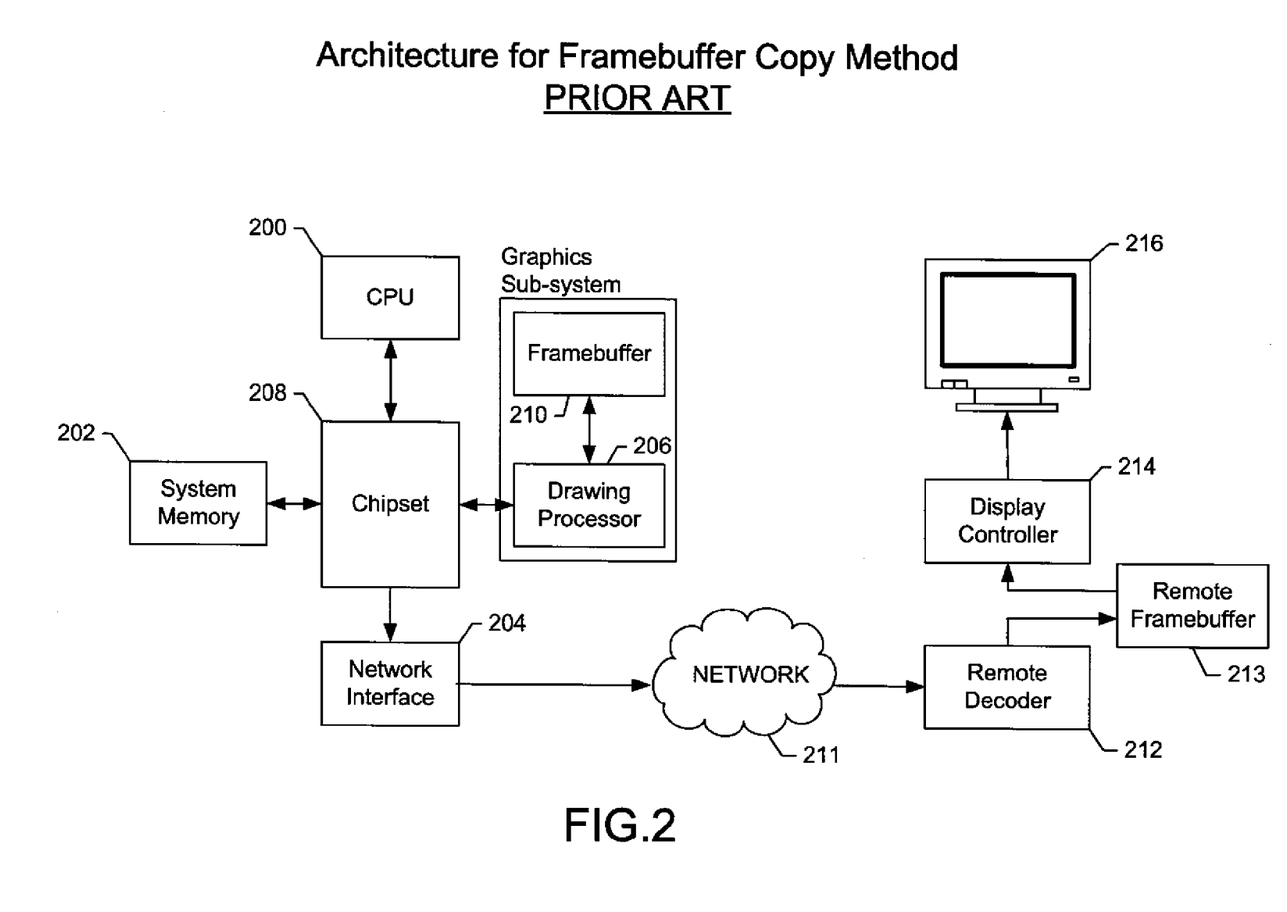
FIG. 2 is an illustration of a prior art data processing system architecture that supports the remote display of compressed or uncompressed display bitmaps using the frame buffer copy method.

FIG. 2 shows the architecture for a data processing system that supports a remote display by copying either compressed or uncompressed bitmaps from a frame buffer across a network. In the diagram, the CPU of the data processor 200 is connected to various peripheral devices including system memory 202, network interface 204 and optional dedicated GPU or drawing processor 206 by chipset 208. As above, the CPU uses a G-API to draw an image. Graphic commands are issued to drawing processor 206 that renders the image in frame buffer 210. Alternatively, the drawing processor might not be a dedicated device but rather a function of the CPU or chipset and the image may be drawn in an area of system memory 202.

Once an image has been rendered in the frame buffer, a software application on the CPU or a peripheral hardware component accesses the frame buffer and copies partial or complete frames across network 211 to remote frame buffer 213. In cases where the frame buffer data is compressed prior to transmission, it is decompressed by software or hardware-based remote decoder 212 before being stored in remote frame buffer 213.

The remote display controller 214 accesses the image, generates a raster signal and displays the image on remote display 216.

In the graphic command transfer method of FIG. 1 and the frame buffer copy method of FIG. 2, remote display controllers 114 and 214 which generate the raster signal that drives the display are controlled by a remote entity. Specifically, remote drawing processor (110 in FIG. 1) or remote decoder (212 in FIG. 2) provides display setup and configuration commands, usually with the support of a remote operating system and graphics driver.

Neither of the methods discussed above support a direct network connection between the frame buffer and the network interface. Consequently, various methods exist to overcome the problem of transferring the image from the frame buffer of the data processor to the remote frame buffer.

For example, VNC is a software product that uses a software application at each end of the network. An encoding application on the data processor reads the frame buffer, encodes the image and then sends it to the decoder application at the remote user interface where it is decoded by the VNC application and written into the remote frame buffer.

A major shortcoming of this technique arises during times of complex image generation. Given the encoder software runs on the same processor as the drawing application, the processor becomes loaded with both encoding and drawing operations that slow down the drawing speed and degrades the user experience. A second shortcoming of this method arises as a result of asynchronous host and remote frame buffers and the fact that the application does not precisely track all screen changes and catch all events on the data processor as might be the case if every refresh of the frame buffer were captured. As a result, the image viewed at the remote display becomes different from the intended image whenever areas of the remote frame buffer are updated out of synchronization with the source frame buffer at the data processor.

OpenGL VizServer™ from Silicon Graphics is another product that uses software applications at each end of the network. Unlike VNC, VizServer is capable of capturing every updated frame buffer by reading the viewable region of every frame into the system memory of the CPU once it has been rendered in the frame buffer. This is achieved by monitoring the G-API for frame buffer refresh commands such as glFlush( ). Once in system memory, the frames are encoded and transmitted across the network to a remote system that requires a minimum of a thin client decoder with drawing capabilities. One problem with this method is that it is CPU intensive. For example, VizServer optimally requires one dedicated CPU for reading the frame buffer, one for managing the network interface and two more dedicated processors to support the compression of the image in system memory. A second problem is that this method uses a software approach to image compression. General purpose CPU's are not optimized around pixel-level image decomposition or compression but are limited to generic block-based color reduction or difference calculation techniques which results in both lower compression ratios and poorer image quality at the remote display. A third problem with CPU-based encoding systems is that they use the network interface of the data processing system for the transmission of display image data. In cases where the same network interface is also used for connectivity of other real-time traffic streams with the remote system (e.g. peripheral traffic such as audio, USB or IEEE 1394 data) and other CPU-bound traffic, the network interface becomes a system bottleneck, packets are either delayed or dropped and the user experience at the remote system is degraded.

A variation on the software-based frame buffer copy approaches such as VNC and OpenGL VizServer described is a screen scraper hardware solution disclosed under U.S. Pat. No. 6,664,969 to Emerson, et al. entitled "Operating System Independent Method and Apparatus for Graphical Remote Access." This method uses a separate hardware module to read the frame buffer, compress the image and send it to an application at the remote user interface. This approach removes the encoding software load, but also consumes the system bus of the data processing sub-system each time the frame buffer is read. In cases where real-time frame updates are required, the load on the system bus directly compromises the performance of the data processor and slows down the application. As with the VNC software method, this method has display continuity problems associated with synchronizing multiple frame buffers or pointers.

There are also variations on the above methods that provide a combination of graphic commands and bitmap transfer functions to enable the remote display of computer display images. One such variation is disclosed by Duursma et al. in U.S. Pat. Application 20030177172 entitled "Method and System for Generating a Graphical Display for a Remote Terminal Session." In this approach, an application on the data processor is capable of recognizing screen images components as either being graphic commands or bitmaps. Graphic commands are handled similarly to the graphic command transfer method described above. However, when a bitmap is identified, a compressed data format of the bitmap is retrieved and transmitted to the remote terminal session in place of the original bitmap. While this feature adds bitmap capabilities to the command transfer method, the command processing overheads persist so little overall improvement to the graphics command processing is realized.

None of the remote display methods described above evaluate the encoding of the image in the context of other data streams that share the network. For example, if the display image incorporates a video frame in one region only, there is no attempt by the frame buffer encoder or the graphics command parser to optimize encoding for that region based on other traffic priorities.

The methods for providing synchronization between a data processor and a remote display system that have been introduced above fall into two categories with respect to display update policies. Push models use the host display timing to determine when to send screen updates from the host to the client. There are both graphic command protocols (such as RDP and Citrix ICA) and frame buffer copy methods (such as Sun Ray) that synchronize display updates to the host timing. Of these, some (such as RDP and ICA) queue the display updates and then send them at regular intervals. Lai and Neih in "Limits of Thin Client Computing" found these methods to deliver poor quality for video display sessions. Others, such as Sun Ray and X send the updates as soon as the server system issues a window system command and have been found to deliver better video performance. As discussed previously, all of these methods require a client system capable of interpreting the graphic commands and rendering the display image.

Client-pull protocols such as the VNC frame buffer copy method use the client to provide the synchronization and the client requests display updates from the host as needed. The client-pull model has the advantage of being capable of adjusting to network bandwidth availability and client processing ability. If the client or network causes a delay, updates are only requested when the client is ready and the overall performance is inherently scaled. The major downside of this method, as described by Lai and Neih, is that a noticeable delay is incurred when real-time applications are such as video are executed across the network, to the point of significantly degrading the video quality. The reason for the performance degradation is that a 66 ms request delay is inserted every time a new frame is requested. In applications such as video where large changes occur in each requested frame, the request mechanism and network delays cause a bottleneck in the streaming process and quality is degraded.

In summary, existing methods incur significant software and hardware processing overheads and are unable to ensure synchronization between the data processor and remote systems. Those methods that first queue commands at the host before sending them do not support video well. Those that immediately send rendering instructions and provide adequate video quality require a CPU and software at the remote user. Those methods that copy frame buffers across a network do not perform well when there are significant changes in the displayed image and large datasets need to be transmitted after each frame is requested. Therefore, there is a heartfelt need for a better method of accessing the frame buffer that does not impact the system drawing architecture and does not require a client CPU.

SUMMARY OF THE PRESENT INVENTION

The present invention enables the transmission of encoded computer display images from a data processing system to a remote system by providing methods for interfacing a shared drawing memory of the data processor with a remote display controller across a network, including using the remote display controller to generate the display timing for the system.

In one aspect, the present invention provides an adaptive pull-based method for synchronizing frame buffer access and display encoding functions with the refresh rate of a remote display endpoint across a best efforts network.

This remote-based timing method offers a faster adaptation to changing network conditions by allowing the remote system to request data early when the network is congested. Consequently, the latency from when the image is drawn to when it is displayed at the remote display is minimized by encoding and decoding the image marginally ahead of the raster sequence at the remote display controller. Unlike client request protocols such a VNC which request a complete frame from the host once the current frame has been displayed at the client, this method operates with a section of the display frame at a time. Each section is requested in advance of the desired display time such that the section arrives and is decoded just in time for display. This allows the overlap of request and display operations and eliminates large periodic request delays at the end of frame updates.

In another aspect, an encoding system is provided that emulates a local display controller by forwarding display setup and configuration commands to a remote display controller. Unlike the graphics command transfer method of FIG. 1 or the frame buffer copy method of FIG. 2, no independent remote operating system or graphics driver exists to configure and setup the display.

By replacing a fully functional host display controller which has strict memory access timing requirements with an equivalent encoding module with flexible memory access timing requirements in that only requires partial access for display sections is required, memory access on the host system may optimized. By providing the control function of a display controller, the host system is able to operate at the same performance as if an encoding system was not attached. By synchronizing the system display timing to a remote display controller, the remote display controller is able to regulate the timing of the display synchronized drawing function in manner that is transparent of the application and the GPU.

In another aspect, alternative configurations of graphics subsystems are provided, including one with a dedicated network connection, one without a local display port and one enabled by the standard network and data interfaces provided by a data processor.

By providing a network connection dedicated to the remote user interface, the security of the host system is increased and the interference between the display and application network traffic is reduced. By providing alternative configurations, equipment and maintenance costs for the host system can be optimized.

In another aspect, the present invention enables methods for overcoming errors resulting from data transmission over a connectionless network. When encoding or communications errors occur, old or new sections of the frame buffer may be transmitted to recover from the error. The system may also periodically re-encode and transmit sections of the frame buffer if there is uncertainty in the image state at the remote system.

In another aspect, the present invention provides traffic management methods based on monitoring network traffic indicators such as lost packet information to determine the current state of the networks available bandwidth, congestion and latency.

By dynamically adjusting to network changes and maximizing image quality when adequate bandwidth is available but reducing the data and quality during times of network congestion, the remote user experience is continuously optimized.

In summary, the present invention offers many benefits in terms of performance, cost, security and maintenance over alternative existing methods for interfacing a frame buffer with a remote display system across a network. Many other features and advantages of the present invention will become apparent upon reading the following detailed description of the invention, which considered in conjunction with the drawings, in which:

DETAILED DESCRIPTION

Figure 3:
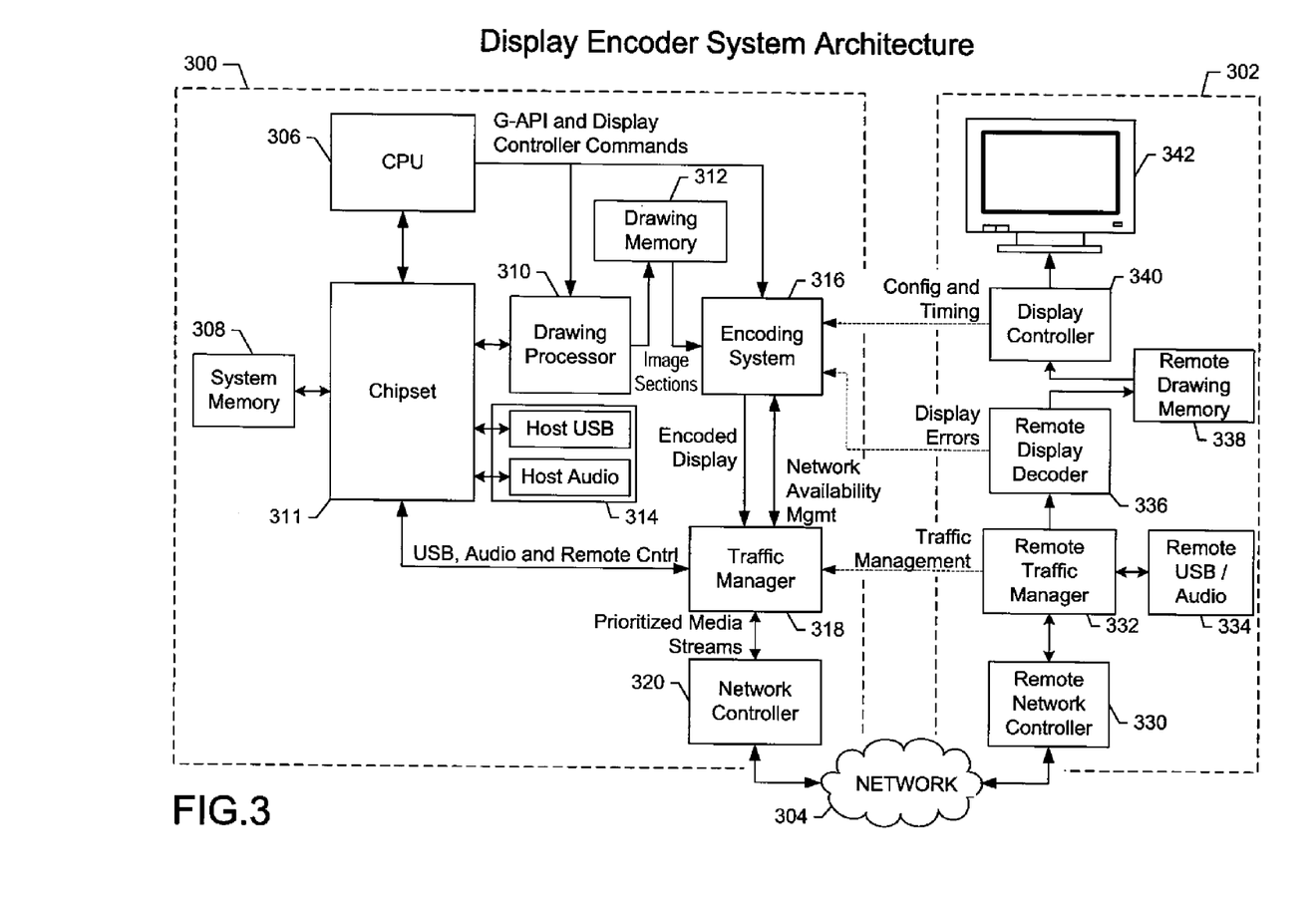
FIG. 3 illustrates a system architecture that enables the aggregation and transmission of display, and peripheral data such as audio and USB between a data processing system and a remote user interface where display images in a frame buffer are encoded and prioritized against other traffic queues based on remote timing requirements and network conditions.

FIG. 3 provides a system view of the present invention. The architecture enables the encoding, aggregation and transmission of display, and peripheral data such as audio and USB streams between a data processing system and a remote user interface. Host system 300 is connected to remote system 302 by network 304. Host system 300 is comprised of CPU 306 connected to system memory 308 and drawing processor 310 by chipset 311. Drawing processor 310 is connected to drawing memory 312 that incorporates at least one frame buffer. Host system 300 also includes other peripherals. In the preferred embodiment, peripheral controllers such as host USB and audio controllers 314 are connected to CPU 306 via chipset 311. In alternative embodiments, these functions may be implemented in software on CPU 306 or embedded in other host sub-systems, including chipset 311 or encoding system 316.

Encoding system 316 is connected to drawing memory 312 so that it can read and encode sections of the display image in drawing memory 312. In the preferred embodiment, encoding system 316 has directly addressable access to a drawing memory that is used by drawing processor 310. In an alternative embodiment, drawing memory 312 may be part of system memory 308 connected to CPU 306 or chipset 311. In this alternative embodiment, encoding system 316 still has access to the drawing memory. In one embodiment, the encoded display output from encoding system 316 is connected to traffic manager 318. Traffic manager 318 aggregates display streams with other CPU or peripheral traffic and forwards it to network controller 320 that manages the transport from host system 300 to remote system 302. Network controller 320 also receives media stream such as audio, USB and control messages from remote system 302. These are forwarded to traffic manager 318 that in turn passes them to their destination host module.

Display drawing operations are performed in the same way in the disclosed architecture as might occur in an architecture that excludes the encoding functions. CPU 306 issues graphics commands to drawing processor 310 that renders display images in the drawing memory 312. Encoding system 316 then accesses image sections from drawing memory 312 and compresses them using appropriate encoding methods. In the preferred embodiment, the output of encoding system 316 is connected to traffic manager 318 as described. Encoded image sections are forwarded from encoding system 316 to traffic manager 318 where they are prioritized and multiplexed with audio, USB and other data or control signals from CPU 306 or peripherals that are also destined for remote system 302. Traffic manager 318 prioritizes the outgoing traffic based on the real-time demands of the image, audio and USB media streams. Traffic manager 318 also feeds network availability information determined from information such as packet loss and delay to encoding system 316 so that suitable encoding methods may be selected based on network conditions. Multiplexed media and control streams are then forwarded to network controller 320 where they are encapsulated using an appropriate network protocol, for example UDP/IP over an Ethernet network. Network controller 320 then manages the physical and link-layer communication of the data streams to remote network controller 330 in remote system 302.

In the preferred embodiment, remote network controller 330 manages the physical and link-layer communication of the data streams to and from host network controller 320. Remote network controller 330 forwards user-bound traffic to remote traffic manager 332 that reconverts the aggregated streams from the host system into separate streams including audio, USB, image and possibly other streams. In the embodiment shown, USB and Audio streams are directed to remote USB/Audio system 334 and display image data is directed to remote display decoder 336. Remote traffic manager 332 also directs host bound traffic including traffic from the USB/Audio system to remote network controller 330 for encapsulation and transfer.

The image stream is decoded by remote display decoder 336 and stored in remote drawing memory 338. Alternatively, the image is stored directly in drawing memory 338 in compressed form and decoded by the remote display decoder in real-time as controlled by display controller 340. Display controller 340 accesses the image from drawing memory 338 and generates a raster display signal, e.g. Digital Visual Interface (DVI) signal that is used to drive remote display 342.

Network errors and bandwidth availability is managed at various protocol levels by different modules. At the physical and network protocol layers, the transport is managed between network controller 320 and remote network controller 330. The status of network bandwidth availability is a useful parameter for encoding system 316. Remote traffic manager 332 monitors network congestion and availability based on the timing of received packets and periodically communicates with traffic manager 318 regarding network status. Traffic manager 318 forwards this status information to the encoding system that adapts the encoding scheme in real-time based in part on bandwidth availability. Encoding system 316 also predicts future bandwidth requirements based on interpreted drawing commands.

At a higher protocol layer, remote display decoder 336 can detect if image sections are in error, late or dropped. In these cases, remote display decoder 336 communicates with encoding system 316 that the section should be retransmitted.

Encoding system 316 either retransmits the requested section or an updated version, depending on the availability of refreshed information in drawing memory 312.

Figure 4:
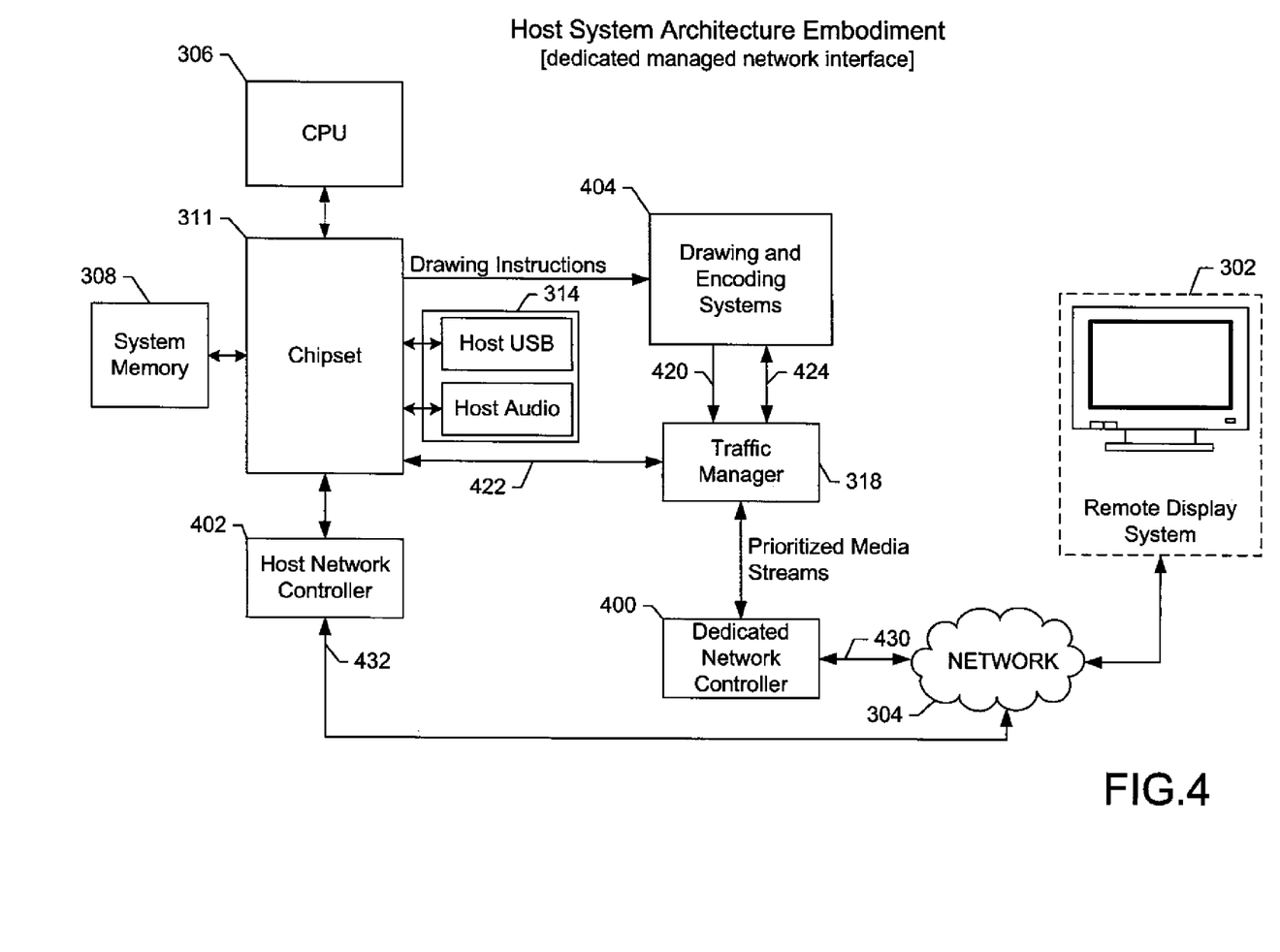
FIG. 4 illustrates a preferred architecture for connecting aggregated media streams to a remote system across a network where the peripheral data and encoded image streams use a separate network interface to other host-related traffic.

FIG. 4 illustrates a preferred embodiment of architecture for connecting aggregated media streams to a remote system across a network. In the diagram shown, remote system streams including audio, USB and encoded image streams 430 use dedicated network controller 400. Other host-related traffic 432 uses the host network controller 402. In one alternative embodiment, audio is transmitted using USB or some other suitable peripheral interface rather than being supported by an explicit audio interface. In other alternative embodiments, USB is replaced by or supplemented with one or more alternative peripheral interface like a UART, IEEE 1394 or other next generation peripheral interfaces.

As a first act in transmitting the image, drawing and encoding system 404 (comprised of drawing processor 310, drawing memory 312 and encoding system 314) forwards encoded image sections 420 to traffic manager 318.

As a second act, traffic manager 318 aggregates the image sections with other remote system traffic including USB, audio and control traffic (signal reference numeral 422). Outbound traffic streams are prioritized based on the real-time demands including the demands of the image, audio and USB media streams. Traffic manager 318 may use graphics commands issued by CPU (signal reference numeral 424) to determine the priority of traffic streams. Some examples include: OpenGL "hints" may indicate that the update of a specific display section is of a high priority; a video sequence might be identified by a video-related command which prompts the traffic manager that a specific audio stream should be synchronized or multiplexed with the encoded display section; a video sub-section of a display is continuously changing so in the case of a period of congestion, this display area can be skipped and drawn with the new image a few frames later; a section of the screen with the pointer may need to be transmitted on every frame at high priority; and delaying the update of a section of screen that is uncovered by a dragging window until a larger area has been uncovered might reduce the immediate bandwidth requirements.

Traffic manager 318 also streams low priority traffic (e.g. USB block transfers) in the background during times of low image update activity and monitors network traffic indicators such as lost packet information to determine the current state of the available bandwidth, congestion and latency. Congestion may be detected early by measuring the round trip delay from packet transmission to packet acknowledgement and looking for any delays in the acknowledgement. It then feeds this network availability information back to drawing and encoding system 404 so that suitable encoding methods may be selected based on current network conditions.

As a third act, traffic manager 318 then forwards the aggregated traffic to dedicated network controller 400. As a fourth act, dedicated network controller 400 encapsulates the traffic streams using an appropriate network protocol, for example in the case of an Ethernet network UDP/IP is suitable for display and audio data while TCP/IP is suitable for control messages. As a fifth act, dedicated network controller 400 transmits the packetized media and control streams to remote system 302 across network 304 and manages ongoing low-level communications of the data streams across the network.

The dedicated network controller method provides enhanced security over alternative methods that use the network controller of the host system for remote system control and display signals. For example, one method of increasing the security is to restrict the inbound ports on the network controller to limited set of predefined port numbers for control, audio, USB and other peripheral traffic.

Figure 5:
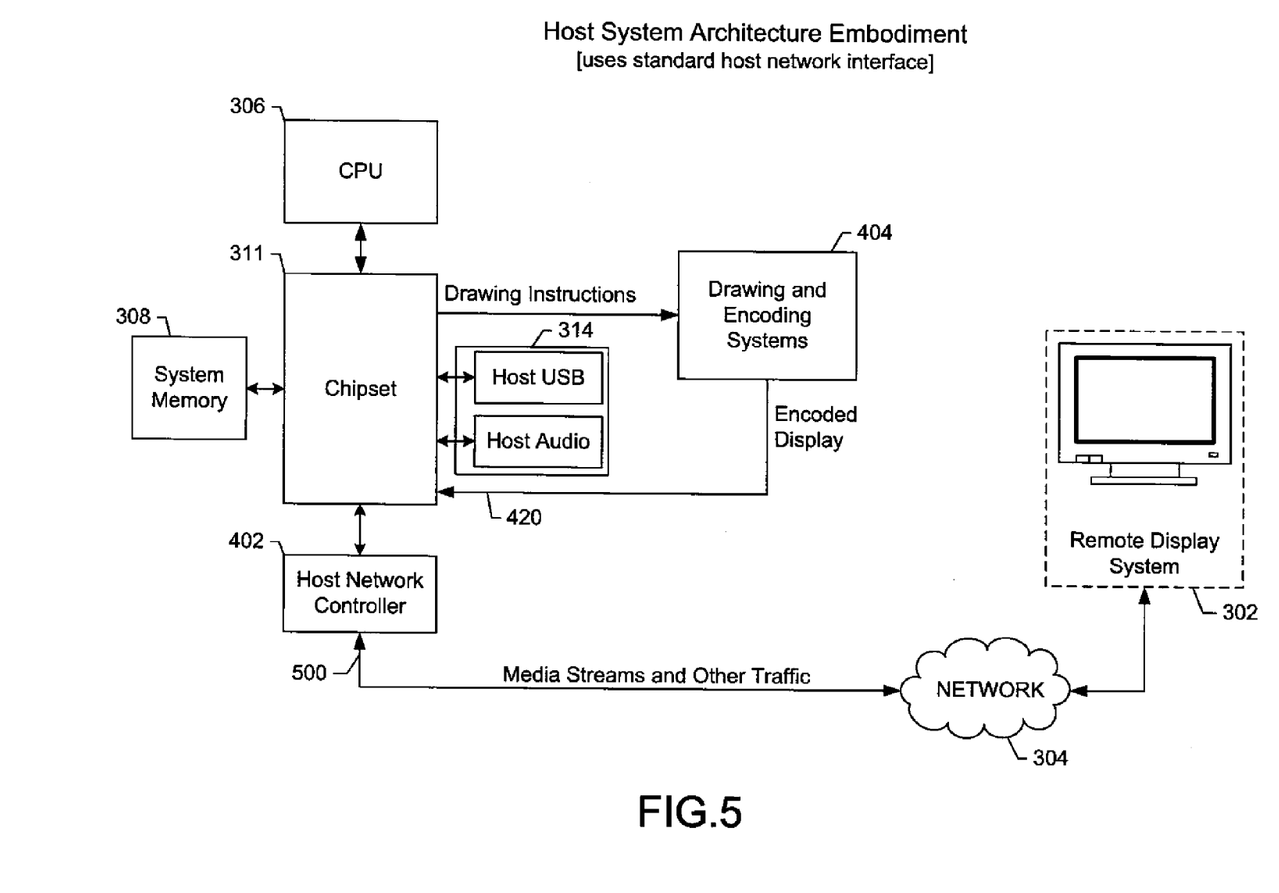
FIG. 5 illustrates an alternative architecture for connecting the aggregated media streams to a remote system across a network where the peripheral data and encoded image streams share the host network interface used by other host-related traffic.

FIG. 5 illustrates an alternative architecture to the one illustrated in FIG. 4 that also enables the communications of streams to a remote system across a network. As shown in FIG. 5, audio, USB and encoded image streams (signal reference numeral 500) share the same host network interface used by other host-related traffic. In the case of the architecture shown in FIG. 5, the drawing and encoding systems do not use a dedicated network interface or traffic manager but rather, encoded image sections are forwarded from drawing and encoding system 404 to standard host network controller 402 of the host system for communication across the network.

Figure 6:
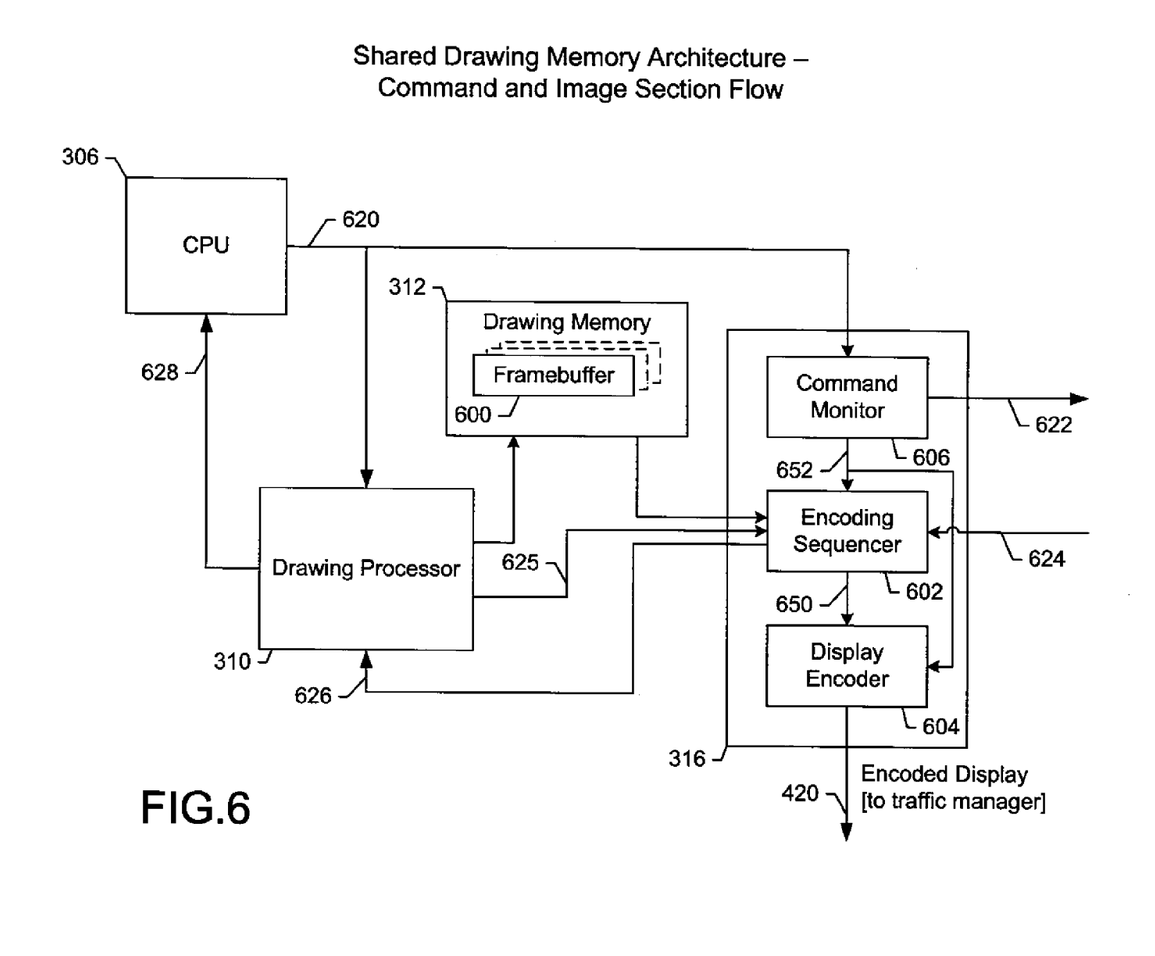
FIG. 6 illustrates the connections between the graphics drawing and encoding modules to provide details of the methods used to synchronize the host modules.

FIG. 6 illustrates the data and control connections between CPU 306, drawing processor 310, drawing memory 312 and encoding system 316 to provide detail on the methods used to synchronize the host modules. Drawing memory 312 is connected to drawing processor 310 by one of several mechanisms. In the preferred embodiment, they are connected by a high-capacity data bus. Alternatively, the graphic drawing system may be a hardware-acceleration function of the chipset or software function embedded within the CPU and drawing memory 312 may be an area of system memory (308 in FIG. 3).

In the embodiment shown, drawing memory 312 incorporates one or more frame buffers 600 which are used by drawing processor 310 to render and store display image frames. Drawing processor 310 draws into drawing memory 312 in the same manner as if an encoding system were not also connected to drawing memory 312 (i.e. in the preferred embodiment, the rendering performance of the drawing system is not impacted by the presence of encoding system 316).

In the embodiment shown, encoding system 316 is comprised of three modules. Firstly, encoding sequencer 602 is similar to a traditional display controller and has read access to drawing memory 312. Encoding sequencer 602 responds to requests for updated display sections by reading the requested sections from the drawing memory. Secondly, display encoder 604 is connected to the output of the encoding sequencer and compresses sections of the display image using several means described below. Thirdly, command monitor 606 has access to the graphics commands issued by CPU 306. Command monitor 606 may either be a software function executing on the CPU, and/or a dedicated function or functions embedded within encoding sequencer 602 and display encoder 604. In the preferred embodiment, display encoder 604 is a dedicated hardware module but it is equally feasible to embed the functionality either as hardware or software (or a combination) within drawing processor 310 or CPU 306.

Encoding sequencer 602 uses synchronized timing means to access pixels, blocks, lines, frames or other sections of image from a frame buffer in the drawing memory. This access is initiated by any of several means, including incoming request signals (signal reference numeral 624) from the remote display decoder or locally generated timing. In the preferred embodiment, updated regions of the display memory are read on request signal 624 issued by the remote display decoder. If drawing processor 310 has indicated that the rendering of a new frame is complete (using frame buffer timing signal 625), encoding sequencer 602 switches to read the new image.

Encoding sequencer 602 then reads the requested image segment and forwards it to display encoder 604 for compression. Encoding sequencer 602 also emulates a local display controller by providing synchronization signals (e.g. VSYNC signal 626 or a vertical blanking signal) for drawing processor 310.

Command monitor 606 filters graphic commands and display configuration information (signal reference 620) issued by CPU 306 to drawing processor 310 for useful information that may facilitate or optimize display encoding. Useful information includes an understanding of image type, co-ordinates, image quality, display priority (i.e. latency) and other attributes of the display. Display encoder 604 uses this knowledge gained from the drawing commands that have been forwarded by command monitor 312 and additional knowledge of which areas of the frame buffer have been updated to compresses image sections or changed areas of the image sections.

Command monitor 606 also monitors CPU 306 for display setup parameters, display controller configuration instructions and timing requirements including display refresh rate issued to the display controller and forwards this as signal 622 to remote display controller 340. Timing requirements are forwarded to encoding sequencer 602 as signal 652. Encoding sequencer 602 uses the information to provide emulated timing for the drawing processor (e.g. generating VSYNC signal 626) and to establish a display session between host system 300 and remote system 302 that defines a display frequency for the remote display system. In one embodiment of the present invention, encoding sequencer 602 transmits image sections as signal 650 to display encoder 604 at the default transmission rate and default phase. In the embodiment, the default transmission rate and phase are the rate and phase that the remote display controller updates the display. In cases where the application is blocked based on the completion of drawing operations (e.g. a waitforvsync( ) function call), the CPU is fully abstracted from the fact that the VSYNC is generated by the encoding system. Encoding system 316 determines the timing of drawing processor 310 but in the case of a blocking command, the token is returned by the drawing system to the CPU (signal reference numeral 628) on command completion as would normally occur. In an alternative embodiment, remote system 302 establishes a default transmission rate and phase and communicates this information to encoding sequencer 624. In one method of establishing a preferred transmission rate and phase, remote system 302 determines the round trip network delay between host system 300 and remote system 302, and adjusts the default transmission rate and default phase to compensate for the round trip network delay.

In an alternative embodiment, the encoding of a section of display memory is requested prior to drawing processor 310 flagging the completion of the rendering operation. In this case, the current image is the previously encoded frame that does not require retransmission. Here encoding system 316 pre-encodes and pre-transmits the new image prior to drawing completion. In this alternative embodiment, the decoding system stores an alternative image and encoding system 316 keeps track of drawing changes that occur after the section of frame buffer. Encoding system 316 then transmits these changed sections after the drawing processor signals the availability of the rendered image. The advantage of this method is that even though some data may be transmitted and never displayed because it is updated before it is displayed, the pre-encoding and pre-transmission of image sections allows the system to make use of otherwise unused network bandwidth to increase the quality of the remote image.

Figure 7:
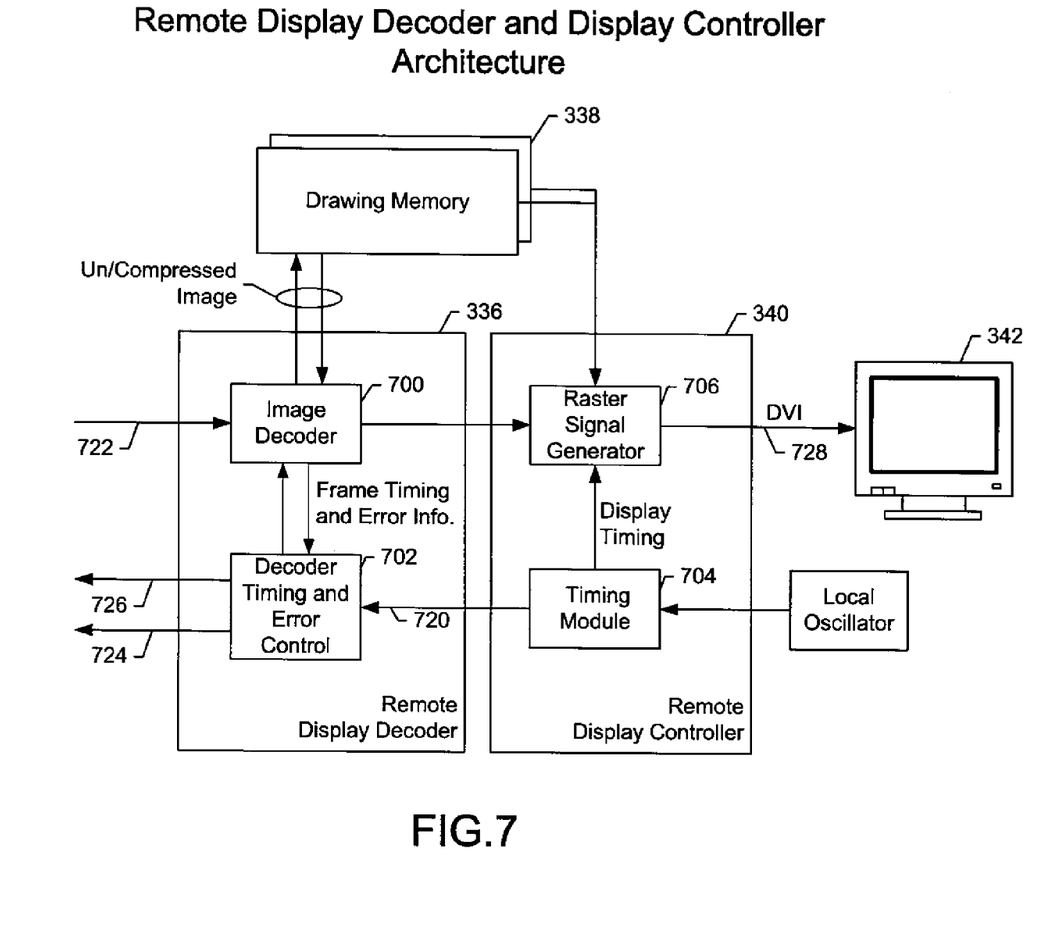
FIG. 7 illustrates the connections between the remote display controller and remote decoder modules to provide details of the methods used to synchronize the remote modules.

FIG. 7 illustrates the connections between remote display decoder 336 and remote display controller 340 to provide further detail on the timing methods provided by the remote system. In the embodiment shown, remote display decoder 336 is comprised of two functional components, namely image decoder 700 and timing and error control module 702. Image decoder 700 performs the inverse operation of encoding system 316 to reproduce an uncompressed image for display. In the preferred embodiment, image sections are decoded and stored in remote display memory 338. In an alternative embodiment, the image sections stored directly in the display memory and decoded under the timing control of remote display controller 340 just prior to being displayed. Remote display decoder 336 may include features such as a cache and history buffers or make use of multiple image frames to minimize the retransfer of previously displayed image data across the network.

Timing and error correction module 702 provides the timing of the frame buffer read operations for encoding sequencer 602 of host system 300 (shown in FIG. 6) based on the combination of display timing signal 720 generated by remote display controller 340 and historic compressed image section arrival times. Inbound compressed images are indicated by reference numeral 722. Nominal timing is derived from a fixed timing signal from remote display controller 340 that defines the timing of raster signal 728. This timing signal is used as a basis for determining the request timing of updated image sections. The round trip latency between an image request and its availability is calculated based on historic arrival times and requests are issued (reference numeral 724) in advance of the nominal display time such that most image sections are available in remote drawing memory 338 ahead of timed raster signal output 728 without the introduction of unnecessary latency.

Figure 9A:
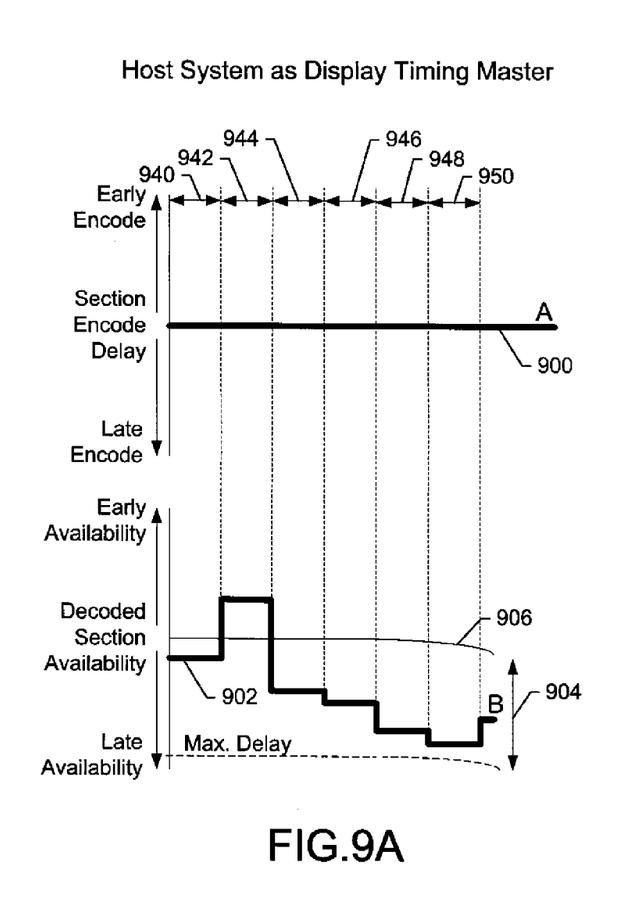
FIG. 9A shows host-derived timing for a system where display timing is generated by the encoding sequencer showing the relationship between when sections of a display are available to the encoding function and when the same decoded sections are available to the remote display controller.
Figure 9B:
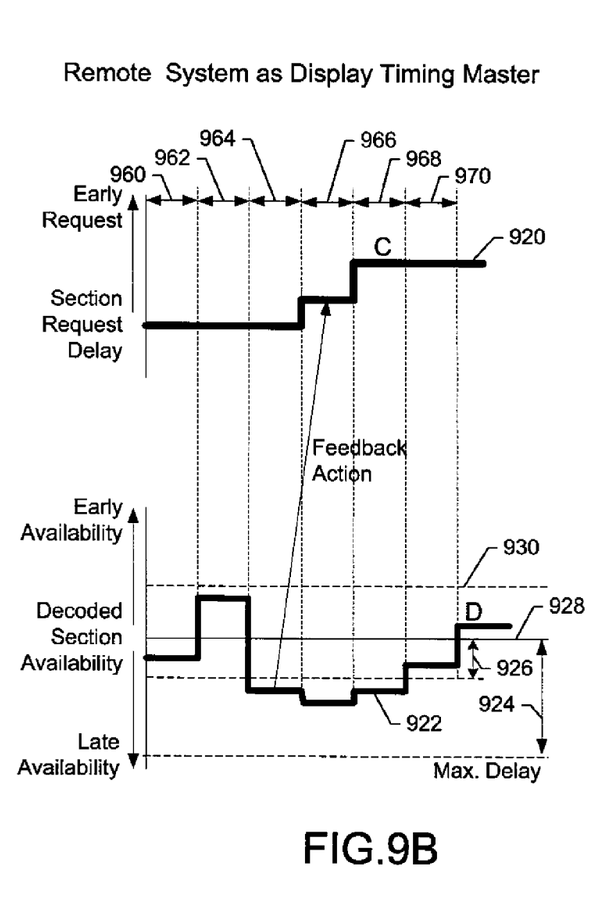
FIG. 9B shows remote-derived timing for a system where display timing is generated by the remote display controller showing the relationship between when sections of a display are requested by the remote display controller and when the decoded sections are available to the remote display controller.

Timing and error correction module 702 continuously monitors the packet arrival times and determines if requests should be advanced or delayed as described in further detail later (FIGS. 9A and 9B). In the case that image decoder 700 signals an erroneous image section or an image section arrives after requested by the remote display controller 340, the module may signal encoding sequencer 726 for retransmission of lost or corrupt image data. To be friendly with the network, retransmission requests for lost image sections should be delayed and/or requested at a lower date rate. Lost packets indicate that the required bandwidth has exceeded the available bandwidth of the network for a period of time and that network bandwidth usage should be reduced.

This active management of arrival times minimizes the latency between when the image section is first rendered in host drawing memory 312 and when it is finally shown on remote display 342. Additionally, it optimizes the error rate by using current and historic response times to balance the latency against an acceptable percentage of late packet arrivals.

Still referring to FIG. 7, remote display decoder 340 is comprised of timing module 704 and raster signal generator 706. Timing module 704 provides the timing for the locally generated display signal e.g. the raster timing used by the Digital Visual Interface (DVI) signal. In embodiments where multiple frame buffers are used, timing module 704 switches frame buffers on vertical blanking as instructed via control messages from the application on host system 300.

In the preferred embodiment, raster signal generator 706 reads uncompressed image sections from drawing memory 338. In alternative embodiments, the display images are stored in encoded form and are accessed via image decoder 700 for decoded prior to transmission to display 342 as a raster. In the preferred embodiment, raster signal 728 is a DVI signal but in alternative embodiments, it may be other digital (e.g. HDMI or DPVL) or analog (e.g. VGA) signals.

Figure 8:
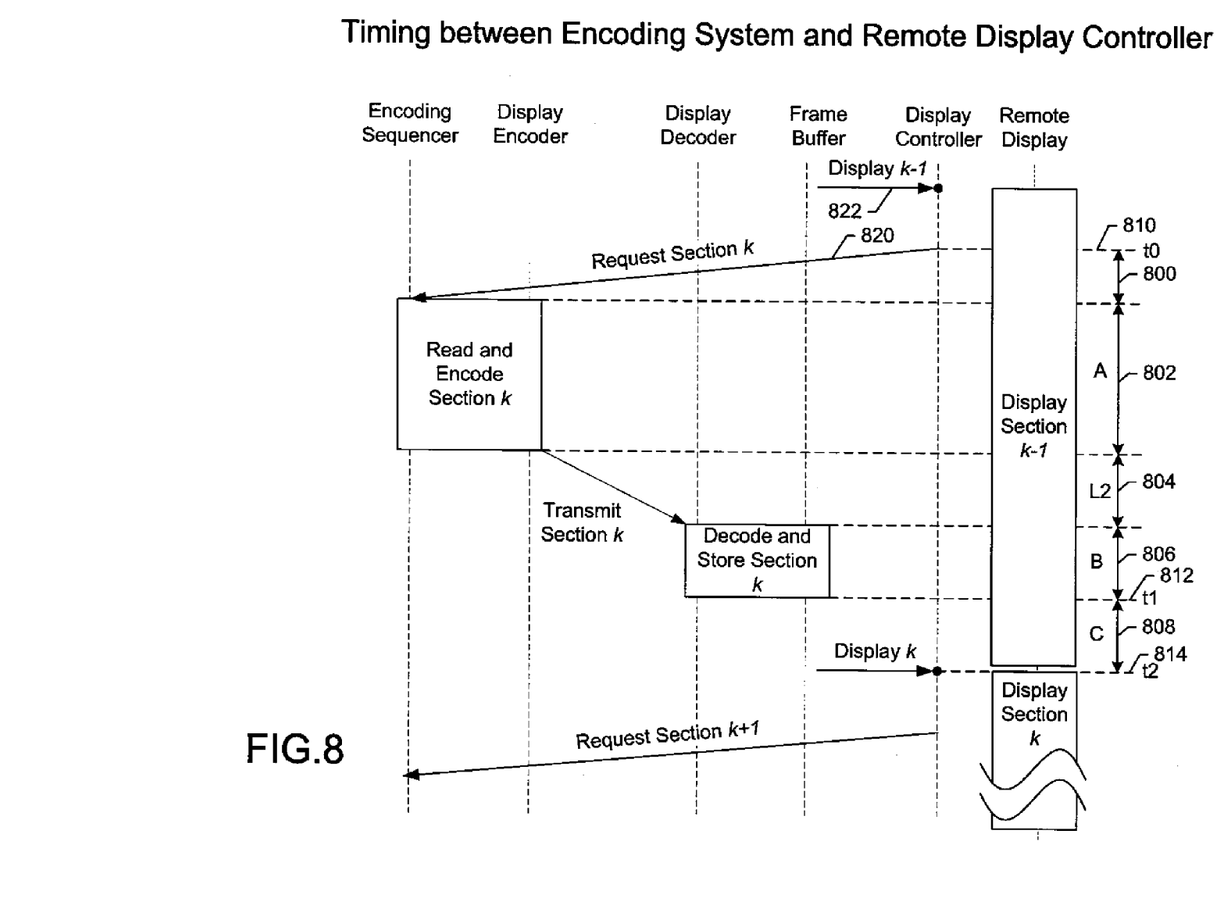
FIG. 8 is a timing diagram that illustrates display timing initiated by the remote system showing the fixed and variable operations that comprise the roundtrip time between when a section of image is requested by the remote display controller and when it becomes available in the remote frame buffer for display.

FIG. 8 is a timing diagram that illustrates the sequence of events for display timing initiated by remote display controller 340. The diagram shows the fixed and variable operations that comprise the roundtrip time between when a section of image is requested by remote display controller 340 and when it becomes available in remote drawing memory 338 for display.

The diagram shows the simple embodiment where a display section k is requested (reference numeral 820) after remote display 342 starts displaying section k−1 (reference numeral 822) under the prediction that section k will be available for display at t=t1 (shown at reference numeral 812) before section k−1 is completed. In an alternative embodiment, section k may be requested multiple sections in advance of being displayed.

As described above, the remote display decoder knows the round trip latency between the when a section of display is requested and when the same section is available in remote drawing memory 338 for display.

As illustrated in FIG. 8, the roundtrip latency is comprised of a series of delay times that make up the total time t1-t0 between when a display section is requested (at t=t0 810) and when it is available for display (at t=t1 812). First delay 800 is the network delay time between when the request message is sent and when it is received by encoding sequencer 402. This delay has limited variability based on network availability.

The next delay (shown as delay 802) is the time taken to read and encode the image section. Encoding is a limited length operation based on the time taken to encode an image where all pixels have changed. If only part of the image has changed, the encoder may take less time the additional processing time may be used to improve the quality of the encoding. Long encoding times cause the roundtrip latency to be extended. This delay may be compensated by advancing the display section request as described above. Alternative encoding methods that take less time may also be used to shorten the roundtrip latency. For stable system control, delay time 802 should be relatively constant or predictable.

The next delay (shown as delay 804) is the time taken to transmit the encoded section. This operation uses significant network bandwidth and is therefore very susceptible to being affected by or causing network latency in cases where there is limited bandwidth available. Delay 806 is a limited latency period allocated to the time used by image decoder 700 to decode and store the image section for access by raster signal generator 706. There may be minor variations in this latency based on the degree of change in the image section.

If sections are repeatedly available ahead of the nominal expected timing (extended time 808 in FIG. 8), the timing of the display request may be delayed to reduce the overall latency between when the image is decoded and when it is displayed (i.e. reduce time 808). If a significant percentage of sections arrive too late over an extended period (i.e. time t1 812 is extended beyond time t2 814), the display request is advanced. In cases of temporary periods of poor network availability, other methods may be used to prevent an increase in display latency. One example method would be to reduce the image data by temporarily increasing the image compression level. A second example method might be to adopt an alternative compression method that takes less computation time (i.e. decrease time 802).

FIGS. 9A and 9B illustrate the benefits of moving the display controller master timing function from the encoding sequencer of the host system to the remote display controller. FIG. 9A shows host-derived timing for a system where display timing is generated by the encoding sequencer. The figure shows the relationship between when sections of a display are available to the encoding function and when the same decoded sections are available to the remote display controller. Trace A of FIG. 9A shows the encoder timing for 6 consecutive image sections 940, 942, 944, 946, 948 and 950 relative to the master frame timing.

Because the frame timing is determined by VSYNC signal 626 (shown in FIG. 6) or a vertical blanking signal that is initiated by the encoding sequencer itself, each section is encoded on an unvarying periodic basis. As a result, trace A shows no deviation from the nominal encoding period. Sections are proactively transmitted on frame buffer ready signal 625. In systems where there is no frame buffer ready signal, the encoding system accesses drawing memory 338 on an asynchronous basis, independent of the drawing operation.

Trace B 902 shows the availability of the same 6 image sections at the remote decoder once they have been transmitted across the network. Time delay 904 shows the time threshold set after which image sections arrive too late to be decoded ahead of being displayed by raster signal generator 706 in FIG. 7. As shown, the image sections arrive at different delays relative to nominal expected arrival time 906, dependent on instantaneous network availability when the section was transmitted. In the example shown, sections 944, 946, 948 and 950 show ever-increasing delays. This would be a typical situation in a case where network availability is temporarily reduced for external reasons, such as large data transfers from other applications on the network.

Given the open loop nature of the system (i.e. no inherent feedback mechanisms to the encoder), the decoder should delay its display time thereby delaying expected arrival time 906. An alternative remedy to prevent late sections is for the remote display decoder to send an out of band control message to the encoding sequencer to change its encoding method. For example, a higher compression ratio might temporarily be enforced to reduce network congestion. However, in instances where the remote display traffic is not the cause of the congestion for example when the display controller oscillator drifts, reducing the bandwidth of the remote display traffic will have limited or no effect.

Therefore the remote display timing must be adjusted to account for the later arrival time, otherwise the image won't be available until the next frame time. However, as shown by the slow adaptation of the nominal availability curve 906, the rate at which the remote display timing can be change is very low, being limited by the amount of variation the display device can handle. CRTs are especially intolerant of display timing variations.

The result is that this display control method requires the maximum delay threshold 904 to be set to a conservative value, increasing the time between when a section is rendered at host system 300 and when it is displayed at remote system 302 and hence the overall latency.

FIG. 9B shows remote-derived timing for a system where the display timing is generated by timing module 704 of remote display controller 340. FIG. 9B shows the relationship between when sections of a display are requested by timing and error control module 702 (shown in FIG. 7) of remote display decoder 336 and when the same sections are available at decoder 722 (of FIG. 7) for decompression. Trace C 920 of FIG. 9B shows the request timing for the six consecutive image sections 960, 962, 964, 966, 968 and 970 relative to the master frame timing generated by the remote display controller. Trace D 922 shows the relative arrival timing for the same 6 image sections at the remote display decoder. Threshold 924 indicates the time delay after which sections arrive too late to be displayed similar to time delay 904.

As shown, remote display decoder 336 uses two thresholds to control the arrival time of image sections from host system 300. Threshold 926 indicates a delay threshold that flags timing and error control module 702 (in FIG. 7) to use an early request method. The early request method is comprised of advancing the request for the next display section by a time proportional to the excessive delay of the preceding section. Issuing advanced requests has the effect of advancing encoding sequencer 602, and the timing of the encoding sequencer VSYNC signal. Threshold 930 is an early arrival threshold signaling that requests should be delayed.

The example shown in FIG. 9B steps through the sequence of events that illustrates how the early request method enables a better response to network delays than shown in FIG. 9A. As a first act, section 960 is requested by remote display decoder 336 using the method outlined in FIG. 8. As shown in FIG. 9B, the section arrives later than early arrival threshold 930 and nominally expected time 928 but earlier than thresholds 924, 926. As a second act, section 962 is requested and arrives earlier than nominally expected. As a third act, section 964 is requested and arrives later than threshold 926, triggering the early request method. As a fourth act and as a consequence of the early request method, section 966 is requested ahead of schedule as indicated by the advance in trace C. In the example shown, section 966 also arrives after threshold 926. For example, this might be caused by temporary poor network availability. As a fifth act and as a consequence of the early request method remaining in effect, section 968 is requested even earlier than 966. Section 968 arrives earlier than section 966 so no further advance in the request in initiated.

As an alternative to changing the request time, display encoder 604 may be requested to select alternative faster or lower data bandwidth encoding methods. Display encoder 604 can respond instantly (within performance limits) to changes in the encoding request time and compression method. Drawing processor 310 remains synchronized to display encoder 604 by the synchronization signal generated at the end of the encoding of each frame. Display encoder 604 and drawing processor 310 can respond quickly to timing changes because they are much less susceptible to frame timing variations than CRT timing changes or human perceivable variations. This means the system can respond more quickly to changes in latency.

As a consequence of the inherent feedback system at its faster response time, delay tolerance 924 may be set to a small value, enabling a system that is able to adapt rapidly to variations in network availability. In one alternative embodiment, rather than hystersis-based control (between thresholds 926 and 930), direct proportional control methods are used to optimize the decode availability time 928. In a second alternative, rather than using proportional control, the control system generates fixed step sizes to advance or delay the request time. Other alternatives may filter the request changes to provide stability over longer time constant delays caused by the network latency.

In one embodiment that minimizes network bandwidth, no display updates are transmitted to the remote display when the image is constant. Encoding system 316 may select to not respond to the request for display updates. In another embodiment that minimizes network bandwidth, update requests are generated at display encoder 604 rather than at image decoder 700 (in FIG. 7). A corresponding request is only generate by image decoder 700 to correct the timing in cases where the image arrives early or late. Image decoder 700 is the master clock and counters in the encoder timing circuit are updated to correct the timing error each time an update is requested. Update request are only generated when the current timing is incorrect. During long periods of constant image and no network traffic the decoder will generate periodic update request to ensure the timing differences do not drift out of defined tolerances. The acknowledgement of updates may be assembled with timing adjustment requirements to constantly update the timing without generating additional packets.

While a method and apparatus for interfacing a drawing memory with a remote display controller have been illustrated and described in detail, it is understood that many changes and modifications can be made to embodiments of the present invention without departing from the spirit thereof.

What is claimed is:

1. A method of transmitting encoded computer display images from a first computer system to a second computer system, the second computer system having a display controller, the first computer system deriving timing information from the display controller, the display controller configured to transmit a sequence of image sections to a display device, the method comprising:

establishing a display session between the first computer system and the second computer system over a nondeterministic computer network, during which image data is transmitted from the first computer system to the second computer system; and until the display session is terminated, repeating the acts of:

the second computer system requesting at least one section of an encoded computer display image of a plurality of image sections from the first computer system at a predetermined time in advance of when the requested at least one section is to be transmitted by the display controller;

the second computer system receiving the at least one section at a received time, the received time having a received time value;

comparing the received time value of the at least one requested section from the first computer system to a display controller timing value;

determining whether the received time value is outside of range of time values that are within an acceptable delivery time limit with respect to the display controller timing value; and adjusting the predetermined time if the received time value is outside of the range of time values.

2. The method of claim 1, wherein the display controller manages a sequence of data to be displayed, the sequence having a plurality of positions, wherein the requested at least one section is associated with a sequence position, wherein the display controller timing value is derived from a difference between a data sequence position maintained by the display controller at the time the at least one section is received and a data sequence position of the requested at least one section.

3. The method of claim 1, wherein adjusting the predetermined time comprises adjusting the predetermined time based on a history of received time values.

4. The method of claim 1, wherein adjusting the predetermined time comprises adjusting the predetermined time based on previous requests made for sections of encoded display images made at other predetermined times in advance of when the requested sections were to be delivered, the previous requests resulting in no receipt of a requested section.

5. The method of claim 1, further comprising adjusting the range of time values to encompass a different range of time values if the predetermined time is adjusted.

6. The method of claim 1, wherein the second computer system requests the at least one section of an encoded image at a timing interval, the timing interval defined at a rate at which the second computer system expects to process and display the at least one requested section.

7. The method of claim 1, further comprising the second computer system requesting additional section of an encoded image at a timing interval, the timing interval defined by the received time values of received portions of the encoded image.

8. The method of claim 1, wherein requesting at least one portion of an encoded image comprises a single transmission to the first computer system, the single transmission including information about the rate at which sections of display are to be transmitted to the second computer system.

9. The method of claim 1, wherein the second computer system adjusts the timing of the requested section of display by sending information about change required to the first computer system.

10. The method of claim 9, wherein information about change required to the first computer system comprises change to a rate at which image data is sent from the first computer to the second computer.

11. The method of claim 9, wherein information about change required to the first computer system comprises change to a phase of image data that is sent from the first computer to the second computer.

12. The method of claim 1, wherein the second computer system delays the transmission of image data to the display device by a period of time.

13. The method of claim 1, wherein the second computer system comprises a display frequency, further comprising the second computer system receiving display frequency configuration information from the first computer system and setting the display frequency based on the received display frequency configuration information.

14. The method of claim 1, further comprising the second computer system receiving display controller configuration information from the first computer system and configuring the display controller based on the received display controller configuration information.

15. The method of claim 14, wherein the second computer system configures the display controller with respect to timing and phase of the received display controller configuration information.

16. A method of transmitting encoded computer display images from a first computer system to a second computer system, the second computer system having a display controller, the first computer system deriving timing information from the display controller, the display controller configured to transmit a sequence of image sections to a display device, the method comprising:
establishing a display session between the first computer system and the second computer system over a nondeterministic computer network, during which the first computer defines a display frequency and display controller configuration for the second computer and transmits image data in sections to the second computer system at a default transmission rate and a default phase, the default transmission rate and default phase being the transmission rate and phase that the display controller sends visual data to the display device; and
until the display session is terminated, repeating the acts of:
the second computer system receiving the at least one section at a received time, the received time having a received time value;
the second computer system comparing the received time value of the at least one requested section from the first computer system to a display controller timing value;
the second computer system determining whether the received time value is outside of range of time values that are within an acceptable delivery time limit with respect to the display controller timing value; and
the second computer system communicating change information to the first computer system to adjust the transmission rate if the received time value is outside of the range of time values.

17. The method of claim 16 wherein establishing the display session comprises the second computer system configuring the display controller to send visual data to the display device at a default transmission rate and a default phase, and sending indicia about the default transmission rate and default phase to the first computer system.

18. The method of claim 17 wherein the second computer determines a round trip network delay between the first computer system and second computer system, and adjusts the default transmission rate and default phase to compensate for the round trip network delay.

19. A client computer configured to receive encoded computer display images from a host computer system, the client computer comprising:
a display controller, the display controller configured to transmit a sequence of image sections to a display device;
means for deriving timing information from the display controller and sending the timing information to the host computer;
means for establishing a display session between the client computer and the host computer system over a nondeterministic computer network, during which image data is transmitted from the host computer system to the client computer; and
means for, until the display session is terminated, repeating the acts of:
the client computer requesting at least one section of an encoded computer display image of a plurality of image sections from the host computer system at a predetermined time in advance of when the requested at least one section is to be transmitted by the display controller;
the client computer receiving the at least one section at a received time, the received time having a received time value;
comparing the received time value of the at least one requested section from the host computer system to a display controller timing value;
determining whether the received time value is outside of range of time values that are within an acceptable delivery time limit with respect to the display controller timing value; and
adjusting the predetermined time if the received time value is outside of the range of time values.

* * * * *